(No Model.)
T. R. FERRALL.
ANTI-FRICTION BEARING.
No. 328,394. Patented Oct. 13, 1885.
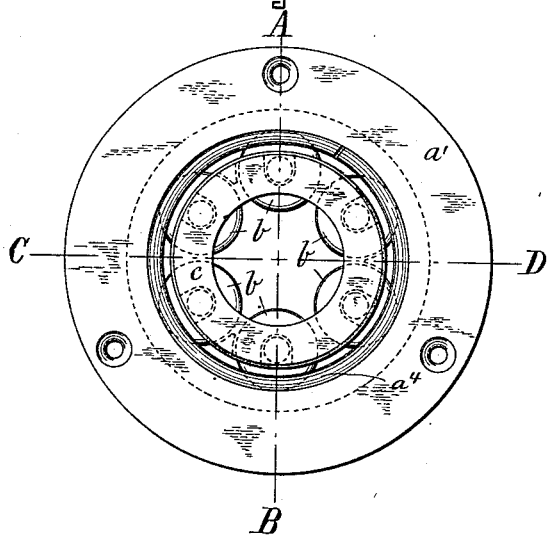
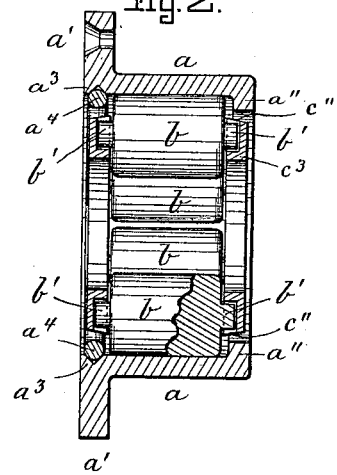
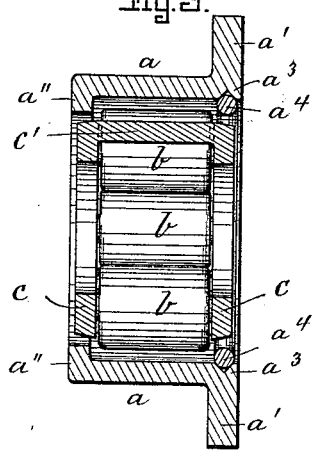
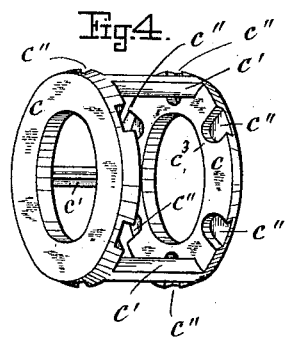
Witnesses
Henry Chadbourn.
Elbert T. Breeding
Inventor
Thomas R. Ferrall.
by Alban Andrew
his atty

UNITED STATES PATENT OFFICE.

THOMAS R. FERRALL, OF BOSTON, MASSACHUSETTS, ASSIGNOR TO THE BAGNALL & LOUD MANUFACTURING COMPANY, OF SAME PLACE.

ANTI-FRICTION BEARING.

SPECIFICATION forming part of Letters Patent No. 328,394, dated October 13, 1885.

Application filed June 27, 1885. Serial No. 169,962. (No model.)

*To all whom it may concern:*

Be it known that I, THOMAS R. FERRALL, a citizen of the United States, residing at Boston, in the county of Suffolk and State of Massachusetts, have invented certain new and useful Improvements in Anti-Frictional Bearings; and I do hereby declare that the same are fully described in the following specification, and illustrated in the accompanying drawings.

This invention relates to improvements in anti-frictional bearings, and it is carried out as follows, reference being had to the accompanying drawings, where—

Figure 1 represents an end elevation of the improved anti-frictional bearing. Fig. 2 represents a central longitudinal section on the line A B, shown in Fig. 1. Fig. 3 represents a horizontal central section on the line C D, also shown in Fig. 1; and Fig. 4 represents a perspective view of the improved regulator.

Similar letters refer to similar parts wherever they occur on the different parts of the drawings.

$a$ is the shell or case, as usual, with external flange, $a'$, in one end, and an internal annular lip or flange, $a''$, in the other, as shown in Figs. 1, 2, and 3, the latter serving to prevent the anti-frictional rollers $b\ b\ b$ from dropping out of shell $a$ at such end. In the opposite end of shell $a$ is made an internal annular groove, $a^3$, in which is laid the split-spring ring $a^4$, as usual, to prevent the rollers $b\ b\ b$ from dropping out from shell $a$ at such end.

I do not wish to confine myself to the use of a split-spring ring, $a^4$, as shown, as, if so desired, a detachable flange may be used as a substitute, although I prefer to use the split-spring ring, as above described.

$b'\ b'$ are cylindrical trunnions in the opposite ends of the anti-frictional rollers $b\ b$, as shown in Fig. 2.

The regulator, for the purpose of holding the rollers $b\ b\ b$ at a proper distance apart within the shell $a$ when the bearing is in use, is fully shown in Fig. 4, and it is composed of a pair of annular rings, $c\ c$, which are held at a proper distance apart and firmly secured together by means of the longitudinal stays or braces $c'\ c'\ c'$, two or more such stays or braces being preferably cast in one single piece with the rings $c\ c$; but, if so desired, they may be made as separate parts and riveted or otherwise firmly secured to rings $c\ c$.

On the interior surfaces of the regulator-rings $c\ c$ are made a number of radial recesses, $c''\ c''\ c''$, corresponding in number on each ring to the number of anti-frictional rollers used in the bearing. Said recesses $c''$ extend in their outer ends to the outer periphery of rings, $c\ c$, so that the trunnions $b'\ b'$ of the rollers $b\ b$ may be laid loosely in such recesses previous to locating the regulator and rollers within shell $a$, as shown in Figs. 1, 2, and 3.

The radial recesses $c''$, I prefer to terminate a short distance from the inner periphery of each ring $c$, as shown in Fig. 4, a solid portion, $c^3$, being left to serve as a stop, to prevent the rollers from going too far toward the center of the regulator when the operator is in the act of placing the rollers in the recesses in the rings $c\ c$.

In practice I prefer to make the trunnions $b'\ b'$ sufficiently long, so as to prevent the ends of rollers $b\ b$ from coming in contact with the inner surfaces of rings $c\ c$, and thus reduce the frictional resistance of the rollers relative to the regulator.

In fitting the regulator and rollers within the shell $a$, I proceed as follows: The regulator being detached from the shell $a$, I place in its recesses $c''\ c''$ the trunnions $b'\ b'$ of the rollers $b\ b$, and after all the rollers have been thus temporarily located on the regulator I introduce the regulator and its rollers within the shell $a$, (the split-spring ring $a^4$ being detached,) after which the expansive ring $a^4$ is laid in the groove $a^3$, or a flanged ring secured to the mouth of shell $a$, to prevent the rollers from dropping out, as shown in Figs. 1, 2, and 3.

By the employment of this my improved regulator I combine lightness with great strength, and as the end bearings for the rollers are arranged in rings firmly secured to each other, the anti-frictional rollers will be caused to run most easily with the least frictional resistance, and without any liability to stick or bind in their bearings. The regulator prevents the rollers from touching each other, so as to run easily against the interior of shell $a$, and on the spindle located within the series of rollers $b\ b$, when the bearing is in use.

This my improved anti-frictional bearing is especially well adapted for pulley-blocks, but is also useful for stationary or other bearings, as well as for other purposes where an anti-frictional bearing is required.

Having thus fully described the nature, construction, and operation of my invention, I wish to secure by Letters Patent and claim—

1. In an anti-frictional bearing, a regulator consisting of a pair of rings, $c\ c$, having recesses $c''\ c''$ on their insides, for the reception of the roller-trunnions, and united by stays or braces $c'\ c'$, as and for the purpose set forth.

2. In an anti-frictional bearing, the regulator composed of rings $c\ c$, having interior recesses, $c''\ c''$, and braces $c'\ c'\ c'$, combined with rollers $b\ b\ b$, having reduced ends or trunnions $b'\ b'$, as and for the purpose set forth.

3. The shell $a$, having annular flange $a''$ and detachable wire or flange $a^4$, in combination with the regulator composed of rings $c\ c$, having recesses $c''\ c''$, for the reception of the end trunnions, $b'\ b'$, of rollers $b\ b$, and braces $c'\ c'$, as and for the purpose set forth.

In testimony whereof I have affixed my signature in presence of two witnesses.

THOMAS R. FERRALL.

Witnesses:
ALBAN ANDRÉN,
E. T. BREEDING.